US006941379B1

(12) United States Patent
Dingsor et al.

(10) Patent No.: US 6,941,379 B1
(45) Date of Patent: Sep. 6, 2005

(54) CONGESTION AVOIDANCE FOR THREADS IN SERVERS

(75) Inventors: Andrew D. Dingsor, Durham, NC (US); Craig A. Lanzen, Durham, NC (US); Harley A. Stenzel, Chapel Hill, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/575,938

(22) Filed: May 23, 2000

(51) Int. Cl.⁷ ............................................. G06F 15/16
(52) U.S. Cl. ..................... 709/235; 709/102; 709/313; 709/230; 709/104; 709/135; 715/501; 395/624
(58) Field of Search .............................. 709/235, 102, 709/313, 230, 104; 395/624; 715/501

(56) References Cited

U.S. PATENT DOCUMENTS

| | | | | |
|---|---|---|---|---|
| 5,708,834 A * | 1/1998 | Sasaki et al. | ............... | 709/203 |
| 5,761,507 A * | 6/1998 | Govett | ....................... | 709/101 |
| 5,781,550 A * | 7/1998 | Templin et al. | ............ | 370/401 |
| 5,809,235 A * | 9/1998 | Sharma et al. | ............. | 709/230 |
| 5,815,662 A * | 9/1998 | Ong | ............................ | 725/92 |
| 5,884,028 A * | 3/1999 | Kindell et al. | ............. | 709/234 |
| 5,938,733 A * | 8/1999 | Heimsoth et al. | .......... | 709/230 |
| 6,012,083 A * | 1/2000 | Savitzky et al. | ........... | 709/202 |
| 6,047,120 A * | 4/2000 | Bell | ............................ | 703/27 |
| 6,078,960 A * | 6/2000 | Ballard | ...................... | 709/229 |
| 6,145,001 A * | 11/2000 | Scholl et al. | ............... | 709/223 |
| 6,170,013 B1 * | 1/2001 | Murata | ....................... | 709/229 |
| 6,175,879 B1 * | 1/2001 | Shah et al. | ................. | 709/330 |
| 6,182,109 B1 * | 1/2001 | Sharma et al. | ............. | 709/104 |
| 6,185,601 B1 * | 2/2001 | Wolff | ......................... | 709/203 |
| 6,223,207 B1 * | 4/2001 | Lucovsky et al. | .......... | 709/107 |
| 6,351,755 B1 * | 2/2002 | Najork et al. | ............ | 715/501.1 |
| 6,357,013 B1 * | 3/2002 | Kelly et al. | ................. | 713/324 |
| 6,377,984 B1 * | 4/2002 | Najork et al. | ............... | 709/217 |
| 6,385,715 B1 * | 5/2002 | Merchant et al. | ........... | 712/219 |
| 6,427,161 B1 * | 7/2002 | LiVecchi | .................... | 709/102 |
| 6,433,795 B1 * | 8/2002 | MacNaughton et al. | .... | 345/738 |
| 6,442,685 B1 * | 8/2002 | French et al. | ............... | 713/100 |
| 6,539,429 B2 * | 3/2003 | Rakavy et al. | ............. | 709/224 |
| 6,665,704 B1 * | 12/2003 | Singh | ......................... | 709/203 |

* cited by examiner

Primary Examiner—William A. Cuchlinski, Jr.
Assistant Examiner—Thanh T. Nguyen
(74) Attorney, Agent, or Firm—Marcia L. Doubet; Jerry W. Herndon (57) ABSTRACT

A method, system, and computer program product for improving the performance, reliability, and recoverability of a computer running a multi-threaded server application. The described techniques enable synchronization requirements to be minimized. A policy is enforced which limits the number of worker threads currently assigned to processing connections to a particular host. Thus if a host fails, some number of worker threads continue to actively service connections to other hosts. The policy may use static or dynamic limits. A single limit may pertain to all hosts, or host-specific limits may be used.

33 Claims, 6 Drawing Sheets

CONGESTION AVOIDANCE FOR THREADS IN SERVERS

BACKGROUND OF THE INVENTION

1. Field of the Invention

The present invention relates to a computer system, and deals more particularly with a method, system, and computer program product for enhancing performance, reliability, and recoverability of a computer running a multi-threaded server application.

2. Description of the Related Art

A multi-threaded application is a software program that supports concurrent execution by multiple threads—that is, a re-entrant program. A thread is a single execution path within such a program. The threads execute sequentially within one process, under control of the operating system scheduler, which allocates time slices to available threads. A process is an instance of a running program. The operating system maintains information about each concurrent thread that enables the threads to share the CPU in time slices, but still be distinguishable from each other. For example, a different current instruction pointer is maintained for each thread, as are the values of registers. By maintaining some distinct state information, each execution path through the re-entrant program can operate independently, as if separate programs were executing. Other state information such as virtual memory and file descriptors for open I/O (input/output) streams are shared by all threads within the process for execution efficiency. On SMP (Symmetric Multiprocessor) machines, several of these threads may be executing simultaneously. The re-entrant program may contain mechanisms to synchronize these shared resources across the multiple execution paths.

Multi-threaded applications are increasingly common on servers running in an Internet environment, as well as in other networking environments such as intranets and extranets. In order to enable many clients to access the same server, the computer that receives and/or processes the client's request typically executes a multi-threaded application. The same instance of the application can then process multiple requests, where separate threads are used to isolate one client's request from the requests of other clients. When a server executes a multithreaded application program, the server may equivalently be referred to as a "threaded server", or "multithreaded server".

The TCP/IP protocol (Transmission Control Protocol/Internet Protocol) is the de facto standard method of transmitting data over networks, and is widely used in Internet transmissions and in other networking environments. TCP/IP uses the concept of a connection between two "sockets" for exchanging data between two computers, where a socket is comprised of an address identifying one of the computers, and a port number that identifies a particular process on that computer. The process identified by the port number is the process that will receive the incoming data for that socket. A socket is typically implemented as a queue by each of the two computers using the connection, whereby the computer sending data on the connection queues the data it creates for transmission, and the computer receiving data on the connection queues arriving data prior to processing that data.

When a multi-threaded server application communicates using a reliable protocol such as TCP/IP, congestion may occur. TCP/IP is considered a "reliable" protocol because messages that are sent to a receiver are buffered by the sender until the receiver acknowledges receipt thereof. If the acknowledgement is not received (e.g. because the message is lost in transmission), then the buffered message can be retransmitted. A limitation is placed on the amount of data that must be buffered at the sender and at the receiver. These limitations are referred to as "window sizes". When the amount of data a sender has sent to the receiver—and for which no acknowledgement has been received—reaches the sender's window size, then the sender is not permitted to send additional data to this receiver.

When this happens, any subsequent write operations attempted by the sender will "block". In the general case, a write operation is said to "block" when the operation does not return control to the executing program for some period of time. This may be due to any of a number of different factors, such as: congestion in the network; a sent message that is not received by the client; a client that fails to respond in a timely manner; filling up the transport layer buffer until the window size is reached, as described above; etc. If a write operation blocks, then the thread which is processing the write operation ceases to do productive work. A server application using a reliable protocol such as TCP/IP has no way of conclusively predicting whether the write operation used to send data to a particular receiver will block. If there are a relatively small number of threads processing the set of connections for a particular server application, then relatively few blocked write operations can cause the entire server application to be blocked from functioning. With the increasing popularity of multi-threaded applications such as those running on Web servers in the Internet, which may receive thousands or even millions of "hits" (i.e. client requests for processing) per day, the performance, reliability, and recoverability of server applications becomes a critical concern. Furthermore, because an incoming request to a server application often has a human waiting for the response at the client, processing inefficiencies (such as blocked threads) in a server application must be avoided to the greatest extent possible.

Accordingly, a need exists for a technique by which these inefficiencies in the current implementations of multi-threaded server applications can be overcome.

SUMMARY OF THE INVENTION

An object of the present invention is to provide a technique for enhancing the performance, reliability, and recoverability of multi-threaded server applications.

Another object of the present invention is to provide a technique whereby these enhancements are achieved by a priori avoidance of congestion for threads in multi-threaded server applications.

It is another object of the present invention to provide this congestion avoidance by enforcing a policy that limits the number of threads which may handle connections to a particular host.

It is yet another object of the present invention to provide a technique for dynamically adjusting the limit on the number of threads used for connections to a particular host.

It is a further object of the present invention to provide a technique for detecting failures or blocks in communication with a particular receiving host, enabling recovery operations to be attempted.

Still another object of the present invention to provide a technique for minimizing synchronization requirements, and the negative results that may occur when multiple threads need access to the same synchronized resources.

Other objects and advantages of the present invention will be set forth in part in the description and in the drawings which follow and, in part, will be obvious from the description or may be learned by practice of the invention.

To achieve the foregoing objects, and in accordance with the purpose of the invention as broadly described herein, the present invention provides a system, method, and computer program product for enhancing performance, reliability, and recoverability of a multi-threaded application by avoiding congestion for threads therein. In a first aspect, this technique comprises: executing a plurality of worker threads; receiving a plurality of incoming client requests for connections onto an incoming queue; transferring each of the received client requests for connections from the incoming queue to a wide queue, the wide queue comprising a plurality of queues wherein each of the queues is separately synchronization-protected; and servicing, by the plurality of worker threads, the client requests by retrieving selected ones of the client requests from the wide queue. The transferring may further comprise placing each of the received client requests on a selected one of the plurality of queues using a First-In, First-Out (FIFO) strategy, wherein the selected one of the plurality of queues is selected using a round-robin approach. In this case, the technique further comprises returning the retrieved selected ones of the client requests to the wide queue using the FIFO strategy and the round-robin approach upon completion of the servicing.

In another aspect, this technique comprises: executing a plurality of worker threads; receiving a plurality of incoming client requests onto a queue, wherein each of the client requests is for a connection to a host; retrieving, by individual ones of the worker threads, a selected one of the client requests from the queue; determining a number of connections to the host to which the connection is requested in the selected client request, wherein this number are those which are currently assigned to one or more of the worker threads; processing the selected client request if the number is less than an upper limit, and not processing the selected client request otherwise; and returning the processed client request or the not processed client request to the queue. The upper limit may be a system-wide value. The upper limit may alternatively be a value specific to the host to which the connection is requested.

When the upper limit is host-specific, the value may be dynamically computed, in which case the technique further comprises: executing a supervisor thread; monitoring, by the supervisor thread, whether connections to each of the hosts succeed or fail; and decrementing the value when the connections to the host fail. Optionally, the value may be incremented when the connections to the host succeed. The monitoring preferably further comprises: setting, by each of the worker threads, a thread time stamp when the worker thread performs active work; comparing, by the supervisor thread, the thread time stamp for each of the worker threads to a system time, thereby computing an elapsed time for the worker thread; and deactivating the worker thread if the elapsed time exceeds a maximum allowable time.

This aspect may further comprise: providing information for each of the hosts, the information comprising an address of the host and a plurality of in-use flags; setting a selected one of the in-use flags when a particular worker thread is processing work on the connection to a particular host, wherein the selected one of the in-use flags is associated with the particular worker thread; and resetting the selected one of the in-use flags when the particular worker thread stops processing work on the connection to said particular host. Determining the number of currently-assigned connections preferably further comprises counting how many of the in-use flags are set.

In this aspect, the queue may be a wide queue comprised of a plurality of First-In, First-Out (FIFO) queues.

The present invention will now be described with reference to the following drawings, in which like reference numbers denote the same element throughout.

DESCRIPTION OF THE PREFERRED EMBODIMENT

Figure 1:
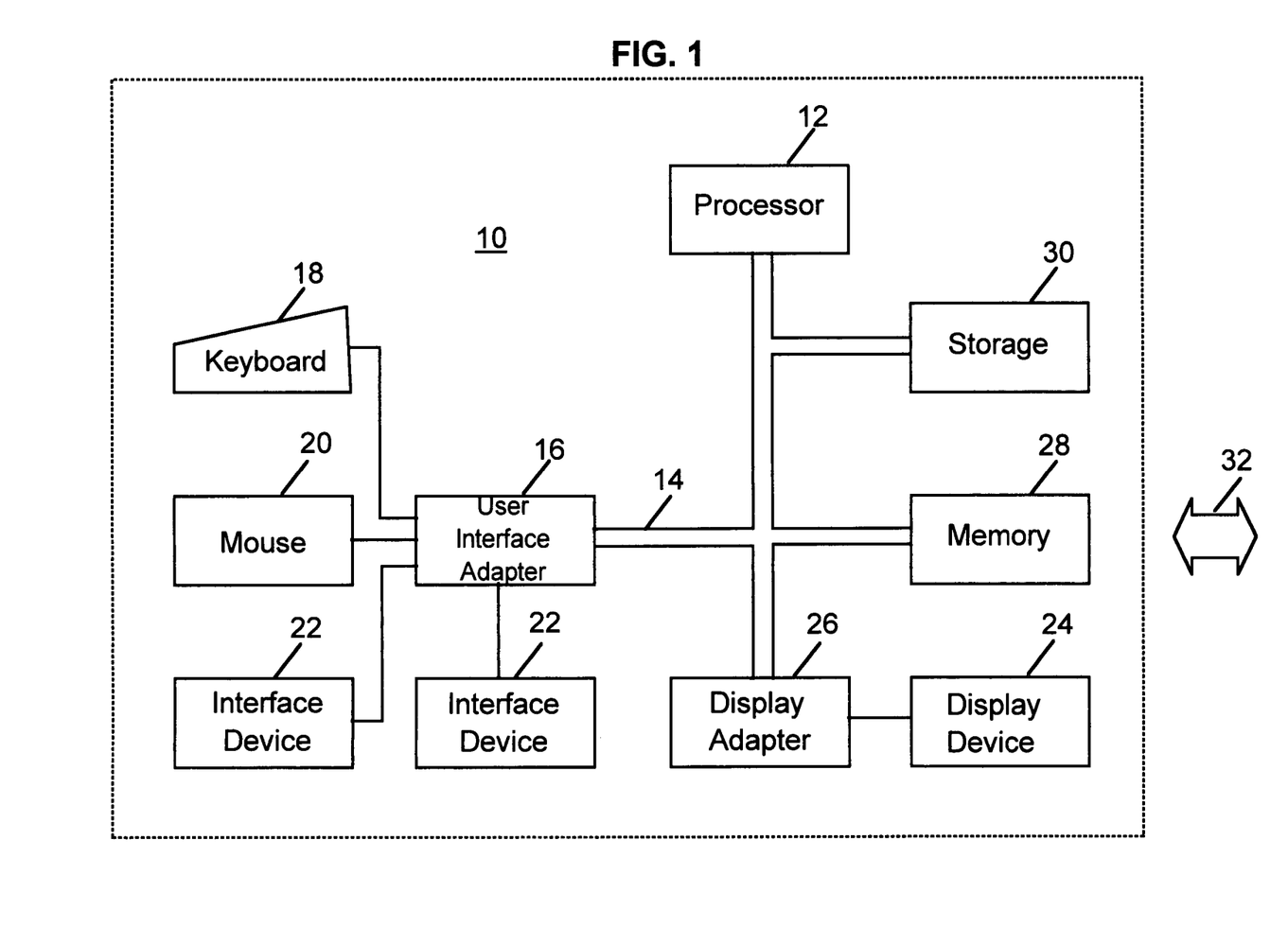
FIG. 1 is a block diagram of a computer workstation environment in which the present invention may be practiced.

FIG. 1 illustrates a representative workstation hardware environment in which the present invention may be practiced. The environment of FIG. 1 comprises a representative single user computer workstation 10, such as a personal computer, including related peripheral devices. The workstation 10 includes a microprocessor 12 and a bus 14 employed to connect and enable communication between the microprocessor 12 and the components of the workstation 10 in accordance with known techniques. The workstation 10 typically includes a user interface adapter 16, which connects the microprocessor 12 via the bus 14 to one or more interface devices, such as a keyboard 18, mouse 20, and/or other interface devices 22, which can be any user interface device, such as a touch sensitive screen, digitized entry pad, etc. The bus 14 also connects a display device 24, such as an LCD screen or monitor, to the microprocessor 12 via a display adapter 26. The bus 14 also connects the microprocessor 12 to memory 28 and long-term storage 30 which can include a hard drive, diskette drive, tape drive, etc.

The workstation 10 may communicate with other computers or networks of computers, for example via a communications channel or modem 32. Alternatively, the workstation 10 may communicate using a wireless interface at 32, such as a CDPD (cellular digital packet data) card. The workstation 10 may be associated with such other computers in a local area network (LAN) or a wide area network (WAN), or the workstation 10 can be a client in a client/server arrangement with another computer, etc. All of these configurations, as well as the appropriate communications hardware and software, are known in the art.

Figure 2:
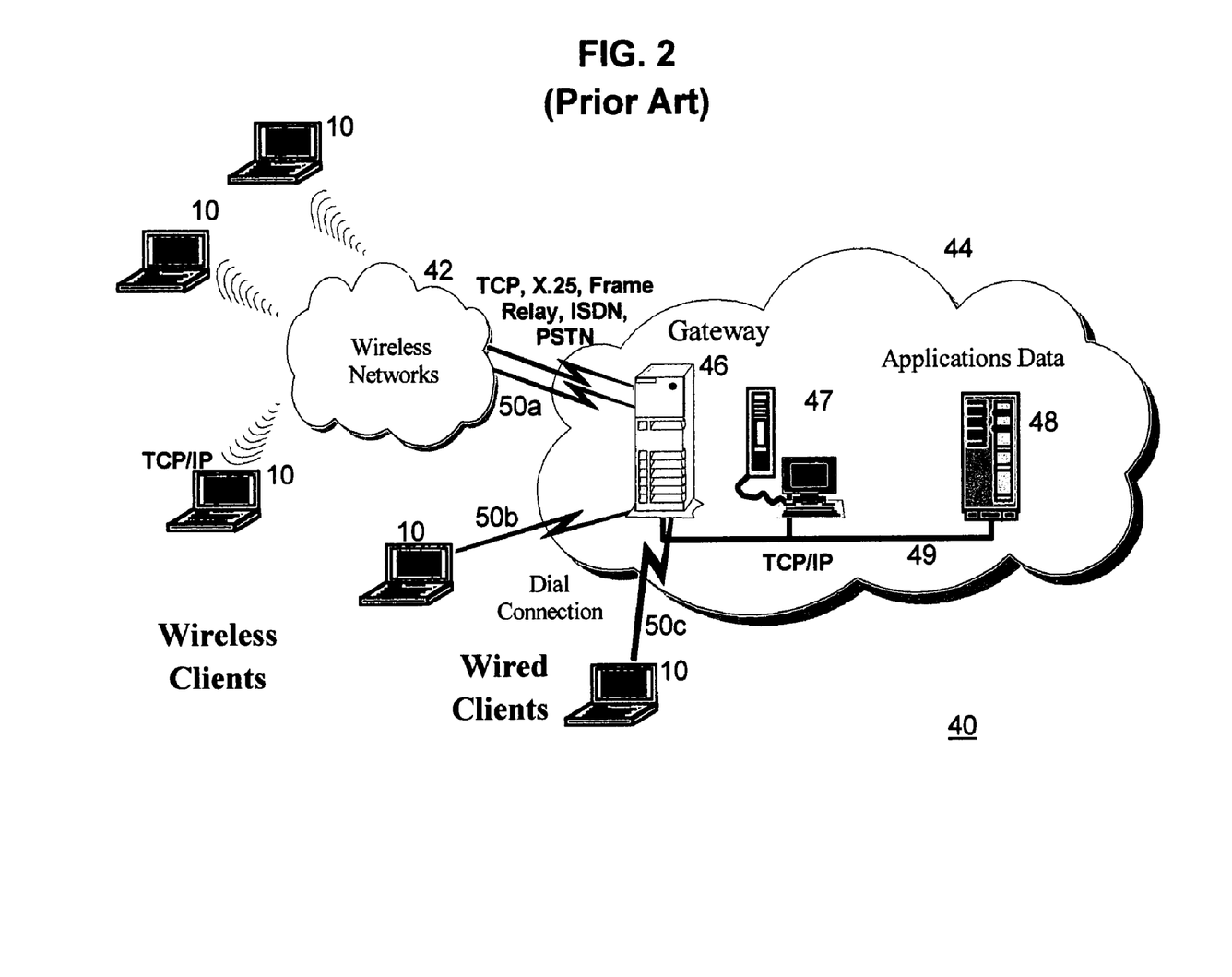
FIG. 2 is a diagram of a networked computing environment in which the present invention may be practiced.

FIG. 2 illustrates a data processing network 40 in which the present invention may be practiced. The data processing network 40 may include a plurality of individual networks, such as wireless network 42 and network 44, each of which may include a plurality of individual workstations 10. Additionally, as those skilled in the art will appreciate, one or more LANs may be included (not shown), where a LAN may comprise a plurality of intelligent workstations coupled to a host processor.

Still referring to FIG. 2, the networks 42 and 44 may also include mainframe computers or servers, such as a gateway computer 46 or application server 47 (which may access a data repository 48). A gateway computer 46 serves as a point of entry into each network 44. The gateway 46 may be preferably coupled to another network 42 by means of a communications link 50a. The gateway 46 may also be directly coupled to one or more workstations 10 using a communications link 50b, 50c. The gateway computer 46 may be implemented utilizing an Enterprise Systems Architecture/370 available from IBM, an Enterprise Systems Architecture/390 computer, etc. Depending on the application, a midrange computer, such as an Application System/400 (also known as an AS/400) may be employed. ("Enterprise Systems Architecture/370" is a trademark of IBM; "Enterprise Systems Architecture/390", "Application System/400", and "AS/400" are registered trademarks of IBM.)

The gateway computer 46 may also be coupled 49 to a storage device (such as data repository 48). Further, the gateway 46 may be directly or indirectly coupled to one or more workstations 10.

Those skilled in the art will appreciate that the gateway computer 46 may be located a great geographic distance from the network 42, and similarly, the workstations 10 may be located a substantial distance from the networks 42 and 44. For example, the network 42 may be located in California, while the gateway 46 may be located in Texas, and one or more of the workstations 10 may be located in New York. The workstations 10 may connect to the wireless network 42 using a networking protocol such as TCP/IP over a number of alternative connection media, such as cellular phone, radio frequency networks, satellite networks, etc. The wireless network 42 preferably connects to the gateway 46 using a network connection 50a such as TCP or UDP (User Datagram Protocol) over IP, X.25, Frame Relay, ISDN (Integrated Services Digital Network), PSTN (Public Switched Telephone Network), etc. The workstations 10 may alternatively connect directly to the gateway 46 using dial connections 50b or 50c. Further, the wireless network 42 and network 44 may connect to one or more other networks (not shown), in an analogous manner to that depicted in FIG. 2.

Software programming code which embodies the present invention is typically accessed by the microprocessor 12 of a server (such as gateway 46 or server 47) from long-term storage media 30 of some type, such as a CD-ROM drive or hard drive. The software programming code may be embodied on any of a variety of known media for use with a data processing system, such as a diskette, hard drive, or CD-ROM. The code may be distributed on such media, or may be distributed to users from the memory or storage of one computer system over a network of some type to other computer systems for use by users of such other systems. Alternatively, the programming code may be embodied in the memory 28, and accessed by the microprocessor 12 using the bus 14. The techniques and methods for embodying software programming code in memory, on physical media, and/or distributing software code via networks are well known and will not be further discussed herein.

Client machines which connect to a server application implementing the present invention may connect using a wireline connection, or a wireless connection. Wireline connections are those that use physical media such as cables and telephone lines, whereas wireless connections use media such as satellite links, radio frequency waves, and infrared waves. Many connection techniques can be used with these various media, such as: using the computer's modem to establish a connection over a telephone line; using a LAN card such as Token Ring or Ethernet; using a cellular modem to establish a wireless connection; etc. The connecting computer may be any type of computer processor, including laptop, handheld or mobile computers; vehicle-mounted devices; desktop computers; mainframe computers; etc., having processing (and optionally communication) capabilities. The remote server, similarly, can be one of any number of different types of computer which have processing and communication capabilities. These techniques are well known in the art, and the hardware devices and software which enable their use are readily available.

In the preferred embodiment, the present invention is implemented as computer software. The software may be implemented as one or more modules (also referred to as code subroutines, or "objects" in object-oriented programming). The server for which the present invention operates may be functioning as a Web server, where that Web server provides services in response to requests from a client connected through the Internet. Alternatively, the server may be in a corporate intranet or extranet of which the client's workstation is a component, or in any other network environment. The present invention may also be used advantageously in a proxy server. Hereinafter, the term "server" will be used to refer to any computer in which the present invention operates. The server may be communicating with a client machine to service requests from that client machine, including requests initiated by a human user. Or, the server may be communicating with other computers such as backend database servers. The term "host" will be used hereinafter to refer to any machine other than the one for which an implementation of the present invention is being described, without regard to the purpose for communicating with that host.

The preferred embodiment of the present invention will now be discussed in more detail with reference to FIGS. 3 through 6.

The present invention provides improvements in performance, reliability, and recoverability for multi-threaded server applications by avoiding congestion for threads. Typically, the present invention will be used in servers which operate in an Internet environment. Alternatively, the servers may be operating in an intranet, extranet, or any other type of networking environment.

Threads may have different roles within a server application. The term "supervisor thread" is used herein to refer to a thread which, inter alia, monitors operation of other threads. The threads which are monitored are those performing the actual servicing of incoming requests, and are referred to herein as "worker threads". The number of worker threads to be created for a particular server application is typically set to some default value, or may be specified (e.g. by a systems administrator) as a configuration parameter during initialization. Typically, this parameter is set so that the server application has a relatively large number of threads, in order to deal with the maximum anticipated connection load (i.e. the maximum number of incoming client requests), or a connection load which has been determined to be optimal for this application. These concepts are well known in the art.

For applications which receive requests from a number of clients, a special "passive" or "listener" socket is created which represents a queue of pending client connections. Each client that needs the services of this application requests a connection to this passive socket, by using the same server port number (although communications using a secure protocol such as Secure Sockets Layer, or "SSL", typically use a different port number than "normal" communications without security, for the same application). The server application accepts a pending client connection from the special passive socket. This creates a new server socket, which is then assigned to an available worker thread for processing. These concepts are also well known in the art.

Worker threads are typically implemented as repeating loops. At the beginning of this loop, a worker thread of the prior art checks the passive socket queue (i.e. the queue which receives incoming connection requests) to determine if there are any connection requests. If a request is waiting, the worker thread removes the request from the queue, and begins to process it. If no request is waiting, the worker thread becomes an idle thread. As a worker thread completes the work request it has been processing, it looks on the queue for its next request. When no more work can be processed for this connection, the worker thread requeues the connection it has been working on. The connection may then be serviced in the future by the same or a different worker thread.

These prior art approaches have certain inefficiencies, however. When prior art queues are shared resources, access to them must be synchronized. Semaphores are typically used for this synchronization, where in the context of connection or socket queues a worker thread sets (i.e. turns on) a semaphore when it is in the process of removing a connection from a socket queue. Other worker threads which may try to access the socket queue will see that the semaphore is set, and will not try to remove a connection until the semaphore has been reset (i.e. turned off). This prior art technique prevents collisions among the worker threads as they access the shared resource, but the serialized access which it enforces leads to wasted processing time for those worker threads which are prevented from obtaining a connection from the queue while the semaphore is set.

Figure 3:
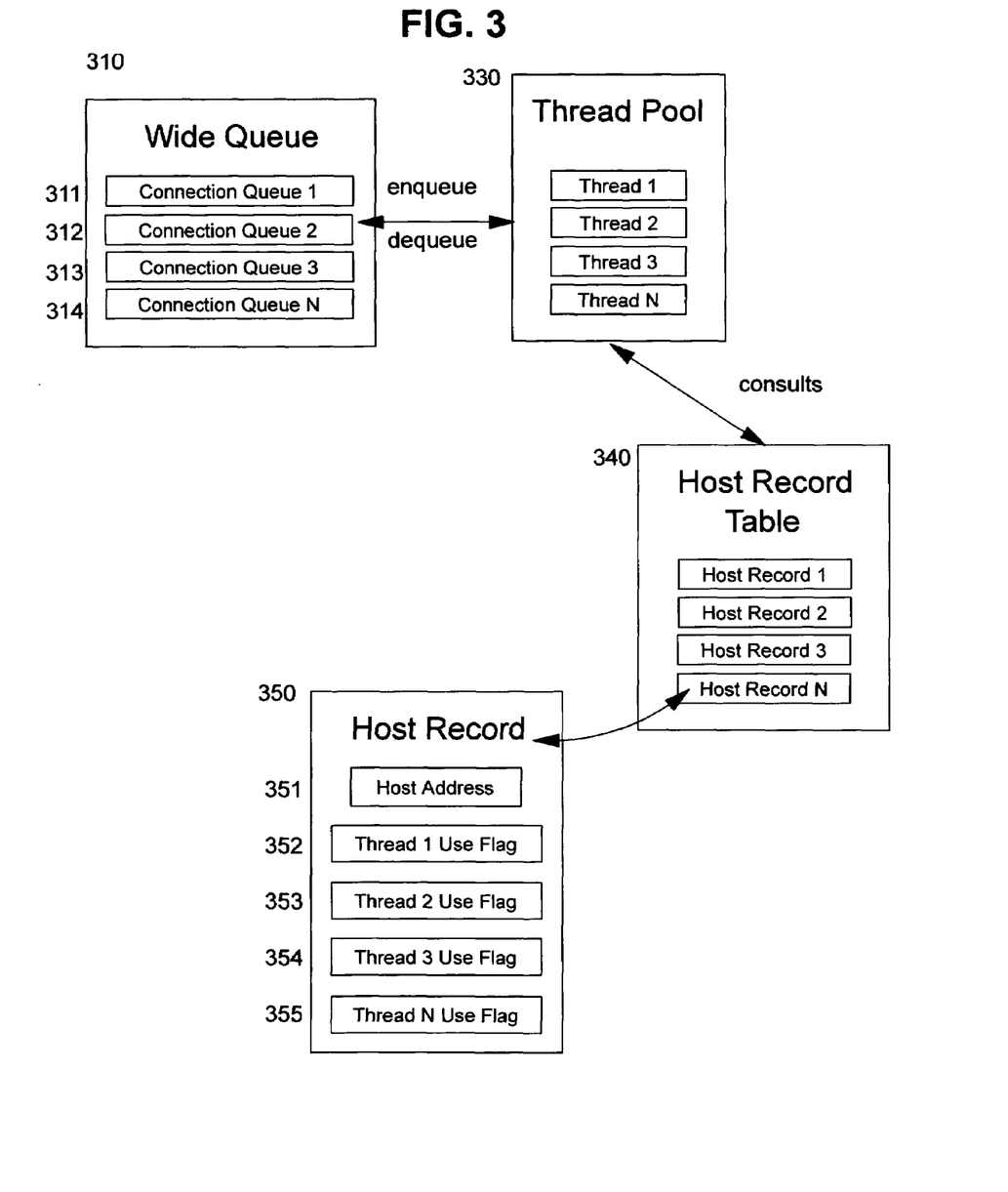
FIG. 3 illustrates the components involved in a preferred embodiment of the present invention.

Instead of the single queue approach used in the prior art for handling connections, in one aspect of the present invention, a "wide" queue or meta-queue (that is, a queue of queues) is used to avoid the above-described inefficiency. A wide queue 310 is depicted in FIG. 3. The elements in this queue 310 are themselves queues (see 311, 312, 313, 314). The listener thread which services the passive socket queue now simply accepts incoming sockets from that queue, and immediately passes them to the wide queue for enqueuing. The worker threads now enqueue and dequeue elements from this wide queue. (Note that the optimal number of queues to use as elements of the wide queue may vary from one implementation to another, and thus the depiction in FIG. 3 is merely illustrative.)

Worker threads, the collection of which is referred to herein as the "thread pool" for a server application, are depicted at element 330 of FIG. 3. According to the present invention, when a worker thread becomes available for servicing a request, it issues a dequeue request against the wide queue 310. In the preferred embodiment, a round-robin approach is used to select from among the plurality of queues 311, 312, etc. in the wide queue, and a connection request is dequeued from the selected queue using a FIFO (First-In, First-Out) strategy. A semaphore is used for protecting each of the individual queues 311, 312, etc., but not for protecting the wide queue. Thus the synchronization is distributed, and is applied at a lower level, when using the present invention. This approach reduces the synchronization among competing worker threads, and thereby decreases the amount of time and processing power that is wasted due to competing worker threads waiting to dequeue a connection. (The processing used by a worker thread after it dequeues a connection from the wide queue defined for the present invention is described below with reference to FIG. 4.)

In another aspect of the present invention, a HostRecord object 350 (or an equivalent data structure, when the present invention is used in non-object-oriented systems) is created for each distinct host address with which the server application communicates. Each HostRecord object 350 comprises a host's address 351 (which is preferably the host's IP address), and a plurality of bits or flags shown in FIG. 3 as elements 352, 353, 354, 355. Each of these flags in the HostRecord object corresponds to a particular worker thread, and is set on when that worker thread is currently processing work for a connection to this host. By using a plurality of flags in this manner, the present invention enables synchronization requirements to be further reduced. That is, the worker threads do not need to set, clear, and check semaphores when accessing a shared object which maintains information regarding the host. Instead, each worker thread has its own "in-use" flag in the HostRecord objects of the present invention. By accessing only their own flags, the worker threads avoid collision as multiple threads may access a single HostRecord object. The in-use flags are preferably implemented as a fixed-size array which supports a fixed number of worker threads. (If the number of worker threads fluctuates over time, the existing arrays may be replaced with new arrays of the appropriate size and with settings that reflect the new number of worker threads.)

A host record table 340 maintains entries for each host with which the multi-threaded application is communicating, as well as a pointer to that host's HostRecord object. When a worker thread dequeues a connection from the wide queue, it consults the host record table to find the HostRecord object for the host to which the connection corresponds. Preferably, the host record table is indexed by an identifier (such as the host's IP address) associated with the host, or a hashed value of such an identifier.

Figure 4:
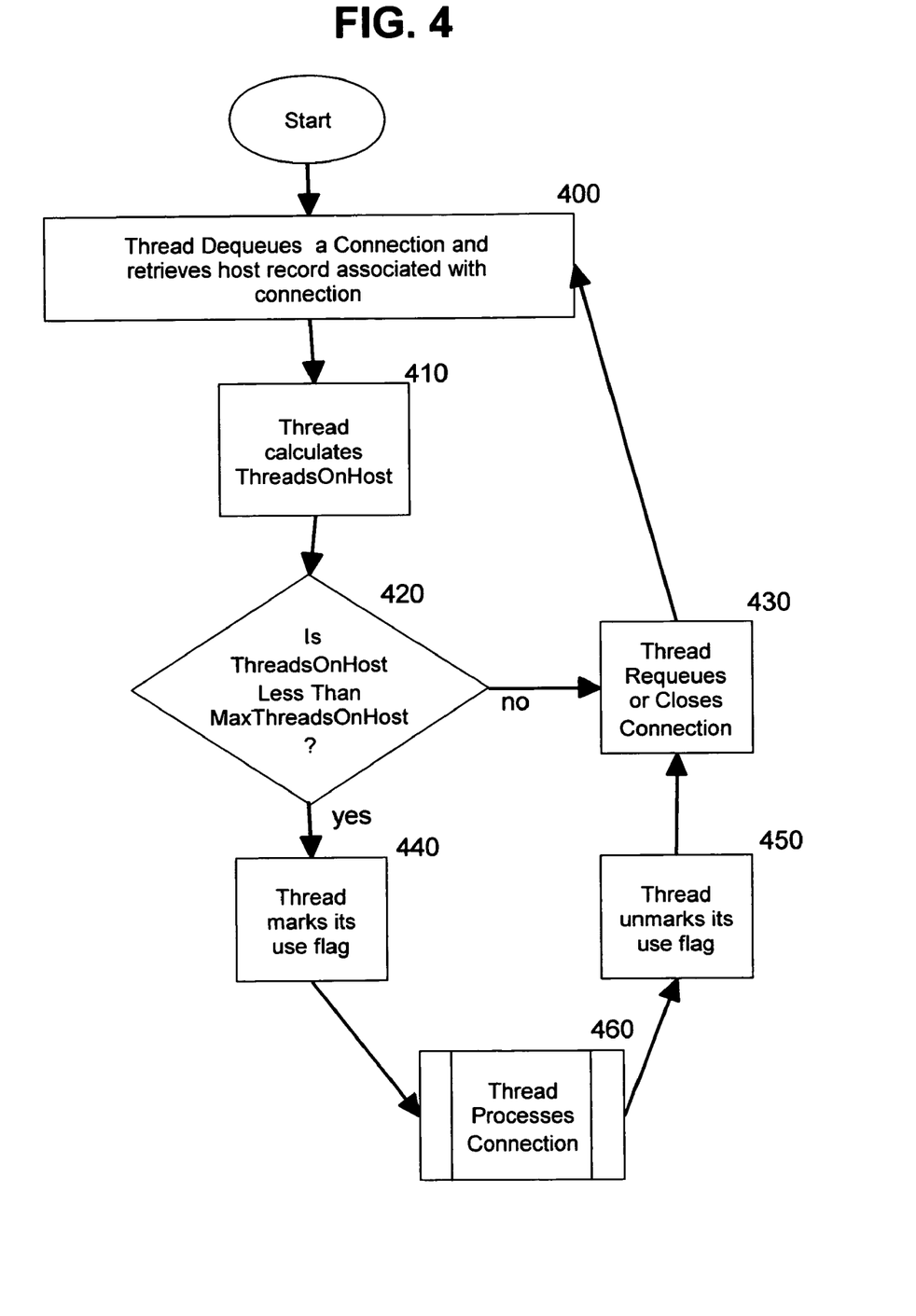
FIGS. 4–6 depict flowcharts which set forth the logic with which a preferred embodiment of the present invention may be implemented.

The flowchart in FIG. 4 depicts a preferred embodiment of the logic which may be used by a worker thread after it dequeues a connection from the wide queue. The process begins at Block 400, where the worker thread performs the dequeuing operation and retrieves the host's HostRecord object (as described above with reference to the wide queue and the host record table). According to an aspect of the present invention, worker threads do not perform work for a connection where that work can be expected to block, e.g. because there is currently no data waiting to be processed for this connection, or because data has already been sent on the connection during the worker thread's processing and a response to this data must now be awaited. Thus, if there is no data waiting for the dequeued connection, the worker thread requeues the connection and retrieves a different connection (e.g. by transferring control to Block 430); otherwise, the worker thread reads the waiting data for this connection, and the processing of FIG. 4 for that connection continues. The worker thread then determines how many connections to this host are currently in use (Block 410), by counting the number of in-use flags in the HostRecord object which are set on.

According to the present invention, a policy is defined which limits the number of concurrent connections to a particular host which are being serviced by worker threads. Enforcing this policy decreases the likelihood that the entire server application, or a significant portion thereof, will become blocked: if a particular host fails or exhibits other behavior that causes the threads servicing it to block, a number of other threads (which cannot be assigned to this host because of the policy) continue servicing connections to other hosts. In one aspect, the policy may set the limit to a fixed number. A single fixed number may apply to each host throughout the system, or alternatively, a different fixed limit may be used for each host. In another aspect, the limit may be adjusted dynamically, based upon whether writes to hosts are observed to succeed or fail. This dynamic limit preferably applies on a per-host basis, enabling each host to have a limit based on that host's recent behavior. When a fixed limit is used, the value of the limit may be statically coded into the implementation, or may be obtained as a configuration parameter (for example, from a systems administrator). When a dynamic, per-host limit is used, the value of the limit is preferably computed as described below with reference to Block 560 of FIG. 5.

When host-specific policy limits are used, it may be desirable to assign a higher limit to one or more hosts which are considered to be "important". For example, if a server application typically communicates with a particular back-end data server (which fails only in very rare circumstances), it may be desirable to allow a higher number of connections to this host. The higher limit may be assigned by specifying an identifier for this host, such as its IP address, along with the value to use for this host's limit. In a server application which has 20 worker threads, a single "important" host of this type might have a limit of 11 worker threads, as an example. If several important hosts are identified for this same scenario, then the limit might be set to a lower number such as 3 worker threads per host.

Block 420 obtains the limit value (referred to herein as "MaxThreadsOnHost") for connections to this host, according to the choices just described. That is, if a single static limit is implemented, the value of that limit may be stored as a global variable, or retrieved from a configuration file, etc. If a per-host limit is implemented, whether static or dynamic, then the host identifier may be used to retrieve this host's limit. (A per-host limit is preferably stored in the HostRecord object for each host.) The number of threads computed in Block 410 (referred to herein as "ThreadsOnHost") is compared to the MaxThreadsOnHost value. If ThreadsOnHost is less than MaxThreadsOnHost, then the policy permits assigning this worker thread to service the connections to this host, and processing continues to Block 440. Otherwise, this host already has the maximum number of worker threads assigned, so control transfers to Block 430.

When control reaches Block 440, the worker thread has been allowed to service the connection to this host. The worker thread thus marks its associated flag as "in-use" in this host's HostRecord object, and processes work for the connection (Block 460). The processing of the connection's work occurs similarly to the prior art, with the limitation that the work must be partitioned in such a way that all state information resides in a connection object (or similar structure) which can be used to resume processing, and that this connection object is stateful. When the processing for the connection completes, the worker thread unmarks its in-use flag (Block 450).

Upon reaching Block 430 (either due to completion of the worker thread's processing, or because the worker thread was not allowed to service this connection), the connection is closed if its work has completed, or is requeued onto the wide queue otherwise. Preferably, requeuing onto the wide queue is done in the same round-robin, FIFO approach used for dequeuing. Control then returns to Block 400, where the worker thread begins another cycle of obtaining a connection and attempting to service that connection.

Figure 5:
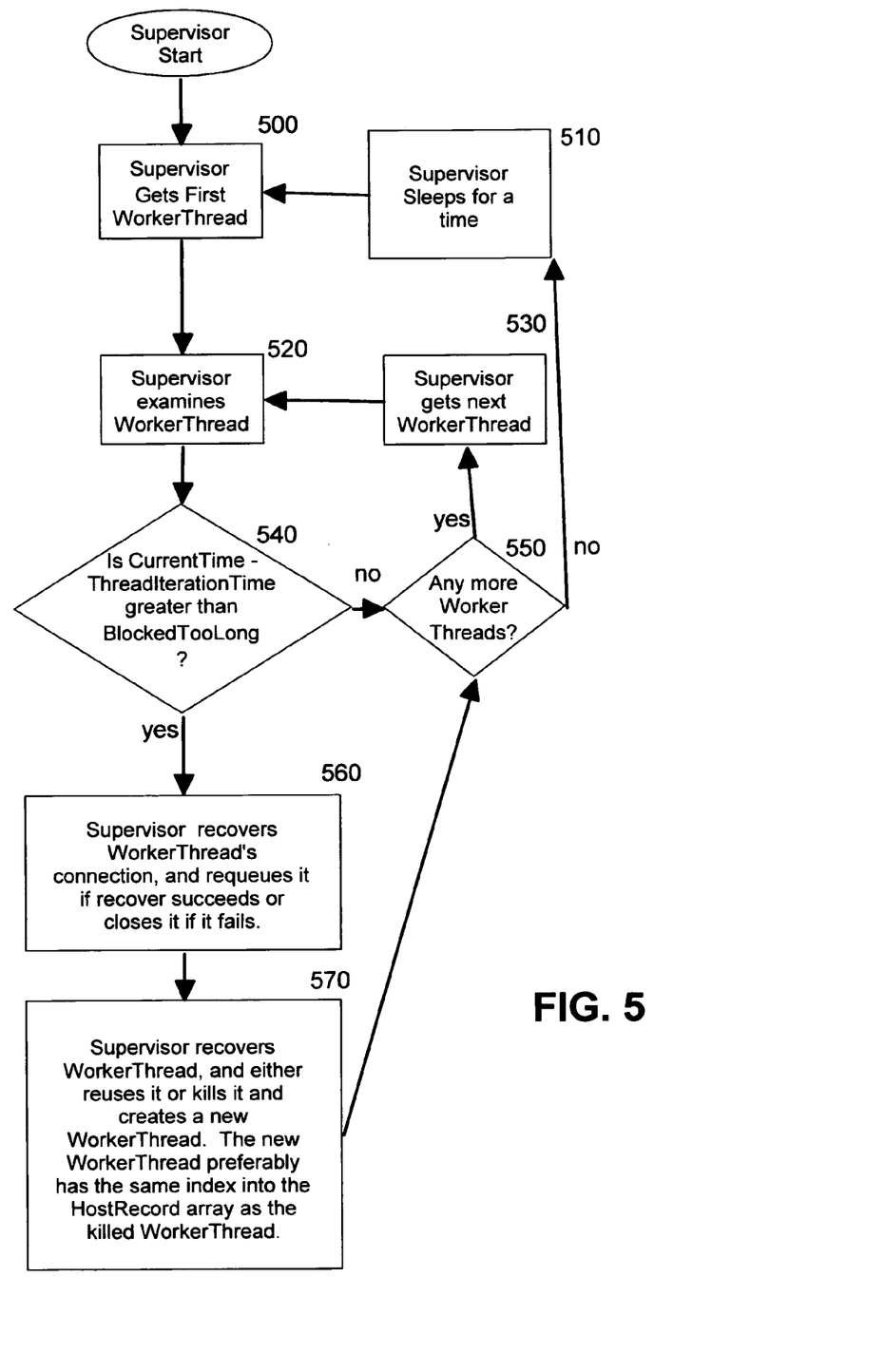

FIG. 5 depicts the logic which may be used to implement a supervisor thread's monitoring and recovery of worker threads. This logic preferably operates in parallel with that of FIG. 4, and is also an iterative loop. At Block 500, the supervisor thread obtains information about a first worker thread. The logic of FIG. 5 then proceeds to evaluate each worker thread in turn, to determine their status. Preferably, all the threads in the thread pool are evaluated in sequence. The evaluation process is directed toward determining whether each worker thread is blocked, waiting for a response from a host that may have failed or otherwise become unavailable.

Block 520 evaluates the current worker thread's status. In the preferred embodiment, a time stamp is used to determine when a response from a host has taken too long. Each worker thread preferably maintains its own version of this time stamp, and updates the time stamp value during the processing loop shown in FIG. 6. A value referred to in FIG. 5 as "BlockedTooLong" is preferably set using a statically-coded default or a value obtained as a configuration parameter, indicating the system-specific time after which it is safe to assume that a thread is blocked waiting for a host response that will not arrive.

At Block 540, the current worker thread's time stamp value (returned to in FIGS. 5 and 6 as "ThreadIterationTime") is subtracted from the current system time. If the result is greater than the value of BlockedTooLong, then processing continues to Block 560 where the supervisor thread attempts to recover the worker thread's connection. Otherwise, control transfers to Block 550. (As will be obvious, care should be taken when determining the value to use for "BlockedTooLong" to avoid inadvertently recovering threads from host connections which are merely experiencing temporary delays.) If the connection can be recovered, the supervisor thread requeues it onto the wide queue (as described above); otherwise, the supervisor thread closes the connection. In this manner, the reliability and recoverability of the server application are improved.

When dynamic host-specific policy limits are implemented, the recovery process of Block 560 also comprises determining, by the supervisor thread, which host the worker thread was communicating with (e.g. by inspecting the in-use flags in the HostRecord objects), and incrementing a failure counter for this host. The host-specific failure counter may then be used in an application-specific manner to decrement the MaxThreadsOnHost value for this host. (For example, for every two failures to one host, the MaxThreadsOnHost value may be decremented by one. Other approaches, such as a one-for-one decrement, may be used as well.)

At Block 570, the supervisor thread attempts to recover the worker thread which was blocked. If the recovery is successful, the thread is reused by restarting the processing of FIG. 4; otherwise, the worker thread is killed and a new worker thread is created to replace it. In this latter case, the new worker thread preferably uses the same index into the in-use flags of the HostRecord objects as the killed thread. Control then transfers to Block 550.

Control reaches Block 550 when the test in Block 540 has a negative result, and following completion of Block 570. When dynamic host-specific policy limits are implemented, an additional operation may optionally be inserted following the negative result of Block 540 and the test depicted in Block 550. This additional operation comprises incrementing a success counter for the host which the currently-evaluated worker thread is servicing. The success counter is similar to the failure counter described above, but is used to increment the MaxThreadsOnHost value for this host. (Again, application-specific considerations may used be to determine whether to increment the MaxThreadsOnHost value for each increment of the success counter, or whether to use another approach for the incrementing.)

The test in Block 550 asks whether there are any more worker threads to be evaluated on this pass through the thread pool. If so, then at Block 530 the supervisor obtains information for the next worker thread, and control returns to Block 520 to begin the evaluation for this worker thread. Otherwise, when all the threads in the thread pool have been processed, control returns to Block 510, which preferably causes the supervisor thread to go into an idle or "sleep" state. In the preferred embodiment, a sleep timer is used to control how often the supervisor thread performs the evaluation process of FIG. 5. Thus, the supervisor thread remains asleep until the timer expires, after which the evaluation process begins again at Block 500.

Figure 6:
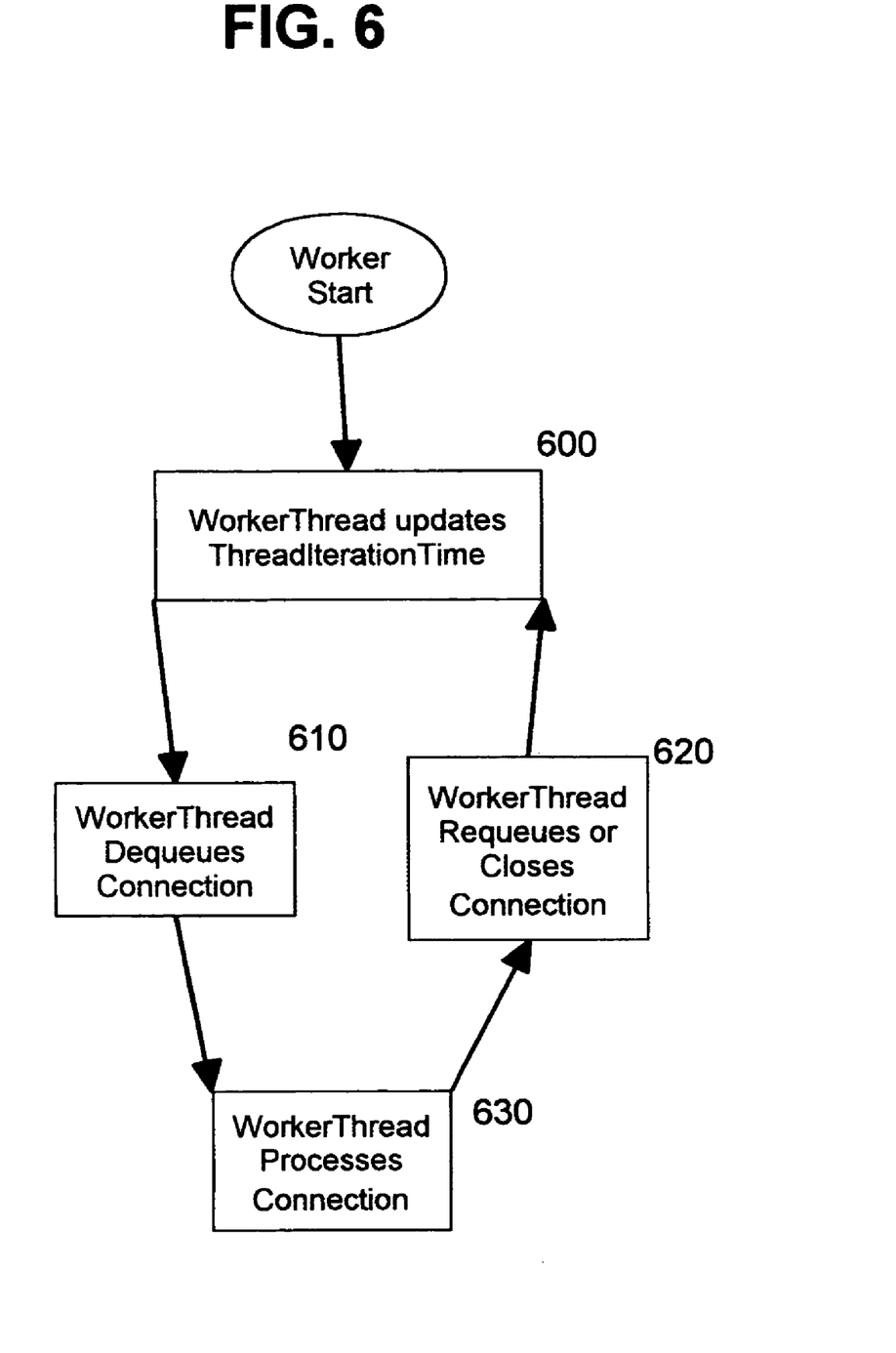

The flowchart in FIG. 6 describes the logic with which the worker threads update their ThreadIterationTime time stamp value. (This value is used by the supervisor thread in Block 540 of FIG. 5, as described above.) Each worker thread updates its ThreadIterationTime as shown at Block 600, after which the worker thread dequeues a connection (Block 610), processes that connection (Block 630), and either closes the connection (if its work has completed) or returns the connection to the wide queue (Block 620). The cycle then begins again, such that the worker thread keeps its ThreadIterationTime value constantly updated while it is actively performing work on connections. (As will be obvious, the updating of ThreadIterationTime may be added to the operations shown in Block 400 of FIG. 4.)

While a number of processing improvements over the prior art have been described, a particular implementation of the present invention is not required to implement each of these improvements. For example, a conventional one-dimensional queue of the prior art may be used instead of the wide queue which has been described: the improvements obtained through monitoring the number of connections to a particular host are independent of the queue structure, and thus an implementation of the present invention which omits the wide queue still achieves improvements over the prior art. As another example, the use of success and failure counters is an optional aspect of the present invention, and advantageous results can be achieved without implementing either or both of these counters or the dynamic adjustments of host-specific policy limits which these counters facilitate.

While the preferred embodiment of the present invention has been described, additional variations and modifications in that embodiment may occur to those skilled in the art once they learn of the basic inventive concepts. Therefore, it is intended that the appended claims shall be construed to include both the preferred embodiment and all such variations and modifications as fall within the spirit and scope of the invention.

What is claimed is:

1. A computer program product for enhancing performance of a multithreaded application, said computer program product embodied on a computer-readable medium and comprising:
   computer-readable program code means for executing a plurality of worker threads;
   computer-readable program code means for receiving, onto an incoming queue, a plurality of incoming client requests for connections;
   computer-readable program code means for transferring each of said received client requests for connections from said incoming queue to a wide queue, said wide queue comprising a plurality of queues wherein each of said queues is separately synchronization-protected; and
   computer-readable program code means for servicing, by said plurality of worker threads, said client requests by retrieving selected ones of said client requests from said queues that comprise said wide queue.

2. The computer program product according to claim 1, wherein said computer-readable program code means for transferring further comprises:
   computer-readable program code means for placing each of said received client requests on a selected one of said plurality of queues using a First-In, First-Out (IFO) strategy, wherein said selected one of said plurality of queues is selected using a round-robin approach.

3. A computer program product for enhancing performance of a multithreaded application, said computer program product embodied on a computer-readable medium and comprising:
   computer-readable program code means for executing a plurality of worker threads;
   computer-readable program code means for receiving a plural of incoming client requests onto a queue, wherein each of said client requests is for a connection to a host;
   computer-readable program code means for retrieving, by an individual one of said worker threads, a selected one of said client requests from said queue;
   computer-readable program code means for determining a number of connections to said host to which said connection is requested in said selected client request, wherein said number are those which are currently assigned to one or more of said worker threads; and
   computer-readable program code means for processing said selected client request if said number is less than an upper limit, and for not processing said selected client request otherwise.

4. The computer program product according to claim 3, wherein said upper limit is a system-wide value.

5. The computer program product according to claim 3, wherein said upper limit is a value specific to said host to which said connection is requested.

6. The computer program product according to claim 5, wherein said value is dynamically computed, and further comprising:
   computer-readable program code means for executing a supervisor thread;
   computer-readable program code means for monitoring, by said supervisor thread, whether connections to each of said hosts succeed or fail; and
   computer-readable program code means for decrementing said value when said connections to said host fail.

7. The computer program product according to claim 6, further comprising:
   computer-readable program code means for incrementing said value when said connections to said host succeed.

8. The computer program product according to claim 6, wherein said computer-readable program code means for monitoring further comprises:
   computer-readable program code means for setting, by each of said worker threads, a thread time stamp when said worker thread performs active work for any selected one of said hosts;
   computer-readable program code means for comparing, by said supervisor thread, said thread time stamp for each of said worker threads to a system time, thereby computing an elapsed time for said worker thread; and computer-readable program code means for deactivating said worker thread and concluding that a connection to said selected host has failed if said elapsed time exceeds a maximum allowable time.

9. The computer program product according to claim 3, further comprising:
   computer-readable program code means for providing information for each of said hosts, said information comprising an address of said host and a plurality of in-use flags;
   computer-readable program code means for setting a selected one of said in-use flags when a particular worker thread is processing work on said connection to a particular host, wherein said selected one of said in-use flags is associated with said particular worker thread; and
   computer-readable program code means for resetting said selected one of said in-use flags when said particular worker thread stops processing work on said connection to said particular host; and
   wherein said computer-readable program code means for determining said number of currently-assigned connections further comprises computer-readable program code means for counting how many of said in-use flags are set.

10. The computer program product according to claim 3, wherein said queue is a wide queue comprised of a plurality of First-In, First-Out (FIFO) queues.

11. A system for enhancing performance of a multi-threaded application, comprising:
    means for executing a plurality of worker threads;
    means for receiving, onto an incoming queue, a plurality of incoming client requests for connections;
    means for transferring each of said received client requests for connections from said incoming queue to a wide queue, said wide queue comprising a plurality of queues wherein each of said queues is separately synchronization-protected; and
    means for servicing, by said plurality of worker threads, said client requests by retrieving selected ones of said client requests from said queues that comprise said wide queue.

12. The system according to claim 11, wherein said means for transferring further comprises:
    means for placing each of said received client requests on a selected one of said plurality of queues using a First-In, First-Out (FIFO) strategy, wherein said selected one of said plurality of queues is selected using a round-robin approach.

13. A system for enhancing performance of a multi-threaded application, comprising:
    means for executing a plurality of worker threads;
    means for receiving a plurality of incoming client requests onto a queue, wherein each of said client requests is for a connection to a host;
    means for retrieving, by an individual one of said worker threads, a selected one of said client requests from said queue;
    means for determining a number of connections to said host to which said connection is requested in said selected client request, wherein said number are those which are currently assigned to one or more of said worker threads; and
    means for processing said selected client request if said number is less than an upper limit, and for not processing said selected client request otherwise.

14. The system according to claim 13, wherein said upper limit is a system-wide value.

15. The system according to claim 13, wherein said upper limit is a value specific to said host to which said connection is requested.

16. The system according to claim 15, wherein said value is dynamically computed, and further comprising:
    means for executing a supervisor thread;
    means for monitoring, by said supervisor thread, whether connections to each of said hosts succeed or fail; and
    means for decrementing said value when said connections to said host fail.

17. The system according to claim 16, further comprising:
    means for incrementing said value when said connections to said host succeed.

18. The system according to claim 16, wherein said means for monitoring further comprises:
    means for setting, by each of said worker threads, a thread time stamp when said worker thread performs active work for any selected one of said hosts;
    means for comparing, by said supervisor thread, said thread time stamp for each of said worker threads to a system time, thereby computer an elapsed time for said worker thread; and
    means for deactivating said worker thread and concluding that a connection to said selected host has failed if said elapsed time exceeds a maximum allowable time.

19. The system according to claim 13, further comprising:
    means for providing information for each of said hosts, said information comprising an address of said host and a plurality of in-use flags;
    means for setting a selected one of said in-use flags when a particular worker thread is processing work on said connection to a particular host, wherein said selected one of said in-use flags is associated with said particular worker thread; and
    means for resetting said selected one of said in-use flags when said particular worker thread stops process work on said connection to said particular host; and
    wherein said means for determining said number of currently-assigned connections further comprises means for counting how many of said in-use flags are set.

20. The system according to claim 13, wherein said queue is a wide queue comprised of a plurality of First-In, First-Out (FIFO) queues.

21. A method for enhancing performance of a multi-threaded application, comprising the steps of:
    executing a plurality of worker threads;
    receiving, onto an incoming queue, a plurality of incoming client requests for connections;
    transferring each of said received client requests for connections from said incoming queue to a wide queue, said wide queue comprising a plurality of queues wherein each of said queues is separately synchronization-protected; and
    servicing, by said plurality of worker threads, said client requests by retrieving selected ones of said client requests from said queues that comprise said wide queue.

22. The method according to claim 21, wherein said transferring step further comprises the step of:
    placing each of said received client requests on a selected one of said plurality of queues using a First-In, First-Out (FIFO) strategy, wherein said selected one of said plurality of queues is selected using a round-robin approach.

23. A method for enhancing performance of a multi-threaded application, comprising the steps of:
   executing a plurality of worker threads;
   receiving a plurality of incoming client requests onto a queue, wherein each of said client requests is for a connection to a host;
   retrieving, by an individual one of said worker threads, a selected one of said client requests from said queue;
   determining a number of concentrations to said host to which said connection is requested in said selected client request, wherein said number are those which are currently assigned to one or more of said worker threads; and
   processing said selected client request if said number is less than an upper limit, and not processing said selected client request otherwise.

24. The method according to claim 23, wherein said upper limit is a system-wide value.

25. The method according to claim 23, wherein said upper limit is a value specific to said host to which said connection is requested.

26. The method according to claim 25, wherein said value is dynamically computed, and further comprising the steps of:
   executing a supervisor thread;
   monitoring, by said supervisor thread, whether connections to each of said hosts succeed or fail; and
   decrementing said value when said connections to said host fail.

27. The method according to claim 26, further comprising the step of incrementing said value when said connections to said host succeed.

28. The method according to claim 26, wherein said monitoring step further comprises the steps of:
   setting, by each of said worker threads, a thread time stamp when said worker thread performs active work for any selected one of said hosts;
   comparing, by said supervisor thread, said thread time stamp for each of said worker threads to a system time, thereby computing an elapsed time for said worker thread; and
   deactivating said worker thread and concluding that a connection to said selected host has failed if said elapsed time exceeds a maximum allowable time.

29. The method according to claim 23, further comprising, the steps of:
   providing information for each of said hosts, said information comprising an address of said host and a plurality of in-use flags;
   setting a selected one of said in-use flags when a particular worker thread is processing work on said connection to a particular host, wherein said selected one of said in-use flags is associated with said particular worker thread; and
   resetting said selected one of said in-use flags when said particular worker thread stops processing work on said connection to said particular host; and
   wherein said step of determining said number of currently-assigned connections further comprises counting how many of said in-use flags are set.

30. The method according to claim 23, wherein said queue is a wide queue comprised of a plurality of First-In, First-Out (FIFO) queues.

31. The computer program product according to claim 1, further comprising:
   computer-readable program code means for returning each of said retrieved selected ones of said client requests for which work has not yet completed to a selected one of said plurality of queues in said wide queue, wherein said selected one of said plurality of queues is selected using a round-robin approach, upon completion of said computer-readable program code means for servicing.

32. The system according to claim 11, further comprising:
   means for returning each of said retrieved selected ones of said client requests for which work has not yet completed to a selected one of said plurality of queues in said wide queue, wherein said selected one of said plurality of queues is selected using a round-robin approach, upon completion of said means for servicing.

33. The method according to claim 21, further comprising the step of:
   returning each of said retrieved selected ones of said client requests for which work has not yet completed to a selected one of said plurality of queues in said wide queue, wherein said selected one of said plurality of queues is selected using a round-robin approach upon completion of said servicing step.

* * * * *

UNITED STATES PATENT AND TRADEMARK OFFICE
CERTIFICATE OF CORRECTION

PATENT NO. : 6,941,379 B1
APPLICATION NO. : 09/575938
DATED : September 6, 2005
INVENTOR(S) : Dingsor et al.

It is certified that error appears in the above-identified patent and that said Letters Patent is hereby corrected as shown below:

Column 12,
Line 23, change "plural of" to -- plurality of --.

Column 14,
Line 23, change "thereby computer" to -- thereby computing --;
Line 38, change "stops process work" to -- stops processing work --.

Signed and Sealed this

Fifteenth Day of August, 2006

JON W. DUDAS
*Director of the United States Patent and Trademark Office*